United States Patent
Polly et al.

(10) Patent No.: US 12,180,842 B2
(45) Date of Patent: Dec. 31, 2024

(54) SELF-GUIDING CARBON SEAL SYSTEM

(71) Applicant: Raytheon Technologies Corporation, Farmington, CT (US)

(72) Inventors: Joseph H. Polly, Tolland, CT (US); Sean P. McGee, Andover, CT (US); Joseph B. Phelps, Rocky Hill, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/112,097

(22) Filed: Feb. 21, 2023

(65) Prior Publication Data
US 2023/0407756 A1    Dec. 21, 2023

Related U.S. Application Data

(62) Division of application No. 17/206,521, filed on Mar. 19, 2021, now Pat. No. 11,608,751.

(51) Int. Cl.
| | | |
|---|---|---|
| *F02C 7/28* | (2006.01) | |
| *F01D 11/00* | (2006.01) | |
| *F16J 15/34* | (2006.01) | |

(52) U.S. Cl.
CPC .......... *F01D 11/003* (2013.01); *F02C 7/28* (2013.01); *F16J 15/3452* (2013.01); *F05D 2240/55* (2013.01); *F05D 2260/38* (2013.01); *F16J 15/3448* (2013.01)

(58) Field of Classification Search
CPC ....... F01D 11/003; F02C 7/28; F16J 15/3452; F16J 15/3448; F05D 2240/55; F05D 2260/38
See application file for complete search history.

(56) References Cited

U.S. PATENT DOCUMENTS

| | | |
|---|---|---|
| 3,276,780 A | 10/1966 | Andresen et al. |
| 3,765,689 A | 10/1973 | Adams |
| 4,261,581 A | 4/1981 | Hershey |
| 4,406,459 A | 9/1983 | Davis et al. |
| 4,928,978 A | 5/1990 | Shaffer et al. |
| 5,160,149 A | 11/1992 | Winn |

(Continued)

FOREIGN PATENT DOCUMENTS

| | | |
|---|---|---|
| EP | 0110804 A1 | 6/1984 |
| EP | 0685048 A1 | 12/1995 |

(Continued)

OTHER PUBLICATIONS

European Office Action dated Nov. 17, 2023 for European Patent Application No. 22157566.5.

(Continued)

*Primary Examiner* — David E Sosnowski
*Assistant Examiner* — Theodore C Ribadeneyra
(74) *Attorney, Agent, or Firm* — Bachman & LaPointe, P.C.

(57) ABSTRACT

An apparatus has a first member, a shaft rotatable relative to the first member about an axis, and a seal system. The seal system has: a seal carried by the first member and having a seal face; and a seat carried by the shaft and having a seat face in sliding sealing engagement with the seal face. The seal system is a dry face seal system. The seat further includes a section having: an outer diameter surface encircled by the seal; and a rim.

20 Claims, 6 Drawing Sheets

(56) References Cited

U.S. PATENT DOCUMENTS

| | | | |
|---|---|---|---|
| 5,464,227 A | 11/1995 | Olson | |
| 6,196,790 B1 | 3/2001 | Sheridan et al. | |
| 8,714,556 B2 | 5/2014 | Pinto et al. | |
| 8,714,558 B2 | 5/2014 | Berard | |
| 9,546,560 B2* | 1/2017 | Larson | F16J 15/3436 |
| 9,574,667 B2 | 2/2017 | Takahashi et al. | |
| 10,030,528 B2 | 7/2018 | Miller | |
| 10,233,762 B2 | 3/2019 | Maret et al. | |
| 10,788,131 B2 | 9/2020 | Miller et al. | |
| 10,975,723 B2 | 4/2021 | Zelesky | |
| 11,131,388 B2 | 9/2021 | Peters | |
| 11,209,086 B2 | 12/2021 | Davis et al. | |
| 11,313,471 B2 | 4/2022 | Phelps et al. | |
| 11,371,374 B2 | 6/2022 | Sawyers-Abbott | |
| 11,401,832 B2 | 8/2022 | Schwendenmann et al. | |
| 2007/0108704 A1* | 5/2007 | Craig | F01D 11/003 277/370 |
| 2012/0080851 A1* | 4/2012 | Berard | F16J 15/366 277/358 |
| 2015/0240950 A1 | 8/2015 | Takahashi | |
| 2016/0003361 A1 | 1/2016 | Takahashi | |
| 2016/0010477 A1 | 1/2016 | Maret | |
| 2016/0032840 A1 | 2/2016 | James | |
| 2016/0116071 A1 | 4/2016 | Pandzik | |
| 2016/0333711 A1 | 11/2016 | Miller | |
| 2018/0306327 A1* | 10/2018 | Itadani | F16J 15/34 |
| 2019/0040957 A1 | 2/2019 | Miller | |
| 2019/0178381 A1 | 6/2019 | Miller | |
| 2020/0132196 A1* | 4/2020 | Davis | F01D 25/183 |
| 2020/0173556 A1 | 6/2020 | Fadgen | |
| 2022/0120346 A1 | 4/2022 | Phelps et al. | |

FOREIGN PATENT DOCUMENTS

| | | |
|---|---|---|
| EP | 2852741 A1 | 4/2015 |
| EP | 3376078 A1 | 9/2018 |
| EP | 4006311 A1 | 6/2022 |
| WO | 2016/118140 A1 | 7/2016 |

OTHER PUBLICATIONS

European Search Report dated Aug. 11, 2022 for European Patent Application No. 22157566.5.

US Office Action dated Jul. 14, 2022 for U.S. Appl. No. 17/206,521.

* cited by examiner

SELF-GUIDING CARBON SEAL SYSTEM

CROSS-REFERENCE TO RELATED APPLICATION

This is a divisional of U.S. patent application Ser. No. 17/206,521, filed Mar. 19, 2021, and entitled "Self-Guiding Carbon Seal System".

BACKGROUND

The disclosure relates to gas turbine engines. More particularly, the disclosure relates to carbon seal systems.

Carbon seals are commonly used to seal between relatively rotating components in gas turbine engines (used in propulsion and power applications and broadly inclusive of turbojets, turboprops, turbofans, turboshafts, industrial gas turbines, and the like). These include shaft seals (i.e., where the sealing surfaces of seal and seat face radially (e.g., within 1.0° or essentially) 0° and extend axially) and face seals (i.e., where the sealing surfaces face axially (e.g., within 1.0° or essentially) 0° and extend radially). In typical face seal situations, the annular carbon seal is axially spring biased into engagement with an annular seat (typically metallic such as a steel). Often, the carbon seal is on a non-rotating static structure and the seat rotates with one of the engine shafts. The sliding engagement causes frictional heating. The heat must be dissipated. With a rotating seat, it is common to use oil cooling. Generally, oil cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both forms of seals, the oil may be delivered through a nozzle and slung radially outward by the rotating component and collected in a radially outwardly closed and inwardly open collection channel from which the passageways extend further radially outward.

As is discussed further below, carbon face seals can be subject to issues of dynamic instability. Permitted radial displacements can lead to coupled axial displacements. The axial displacement may be a local displacement with a maximum displacement location diametrically opposite a contact location. The contact location may rotate. In extreme situations, there may be a full 360° of separation/gap. In addition to leaks when the axial gap opens, the resulting coupled radial and axial displacement can lead to rapid and advanced wear and stresses beyond the capability of the spring element resulting in premature failure of the seal.

SUMMARY

One aspect of the disclosure involves an apparatus comprising: a first member; a shaft rotatable relative to the first member about an axis; and a seal system. The seal system comprises: a seal carried by the first member and having a seal face; and a seat carried by the shaft and having a seat face in sliding sealing engagement with the seal face. The seal system is a dry face seal system. The seat further comprises a section having: an outer diameter surface encircled by the seal; and a rim.

In a further embodiment of any of the foregoing embodiments, additionally and/or alternatively, a radial gap between the outer diameter surface and the seal is formed between: an inner diameter surface portion of the seal; and a portion of the outer diameter surface of said section having a radius $R_{OF}$ varying by no more than 0.12% over a length $S_{A1}$ of 25% to 50% of an axial span $S_{A2}$ from the seat face to the rim.

In a further embodiment of any of the foregoing embodiments, additionally and/or alternatively, the section is along a protruding flange having: an inner diameter surface; and an axial undercut at a root of the section.

In a further embodiment of any of the foregoing embodiments, additionally and/or alternatively, the section has a chamfer surface between the outer diameter surface and the rim.

In a further embodiment of any of the foregoing embodiments, additionally and/or alternatively, the chamfer surface has a half angle of 10° to 45° over at least one of: a radial span $R_{S4}$ of at least 0.50% of a maximum radius of the seat section; and a length $S_{A3}$ of at least 0.25 mm.

In a further embodiment of any of the foregoing embodiments, additionally and/or alternatively, the seat face and the section are of a single unitary piece or the seat face is on a first piece and the section is formed on a second piece.

In a further embodiment of any of the foregoing embodiments, additionally and/or alternatively, the first piece has: a contact face contacting a face of the second piece; and a channel between the seat face and the contact face.

In a further embodiment of any of the foregoing embodiments, additionally and/or alternatively, the seal is a carbon seal.

In a further embodiment of any of the foregoing embodiments, additionally and/or alternatively, the seat is steel.

In a further embodiment of any of the foregoing embodiments, additionally and/or alternatively, the seal and seat are full annular and the seal is interference fit in a seal carrier.

In a further embodiment of any of the foregoing embodiments, additionally and/or alternatively, a bellows spring axially biases the seal into engagement with the seat.

In a further embodiment of any of the foregoing embodiments, additionally and/or alternatively, the bellows spring is captured between a spring carrier and a seal carrier; and the seal carrier carries the seal.

In a further embodiment of any of the foregoing embodiments, additionally and/or alternatively, the seal carrier has an outer diameter sleeve section in interference fit with the seal.

In a further embodiment of any of the foregoing embodiments, additionally and/or alternatively, the apparatus is a gas turbine engine.

In a further embodiment of any of the foregoing embodiments, additionally and/or alternatively, a method for assembling the apparatus comprises: mounting the seal to the first member so as to be cantilever supported by a bellows spring; and installing the seat so that the section passes radially within the seal.

In a further embodiment of any of the foregoing embodiments, additionally and/or alternatively, the section has a chamfer surface between the outer diameter surface and the rim; and the installing causes the chamfer to contact the seal and radially shift the seal.

In a further embodiment of any of the foregoing embodiments, additionally and/or alternatively, a method for using the apparatus comprises: rotating the shaft relative to the first member about the axis; and a dynamic radial excursion of the shaft relative to the first member causing contact between the seat section outer diameter surface and an inner diameter surface of the seal.

In a further embodiment of any of the foregoing embodiments, additionally and/or alternatively, the method further comprises a spring biasing the seal toward the seat.

In a further embodiment of any of the foregoing embodiments, additionally and/or alternatively, the contact is effective to prevent axial separation between the seal and the seal.

A further aspect of the disclosure involves an apparatus comprising: a first member; a seal carried by the first member and having a seal face and an inner diameter surface; a shaft rotatable relative to the first member about an axis; and a seat carried by the shaft and having a seat face in sliding sealing engagement with the seal face. The seat further comprises an outer diameter surface section encircled by the seal and having a centered spacing $R_{S1}$ from the seal inner diameter surface of 0.035% to 1.50% of a maximum radius of the section over a length of at least 0.10% of said maximum radius.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
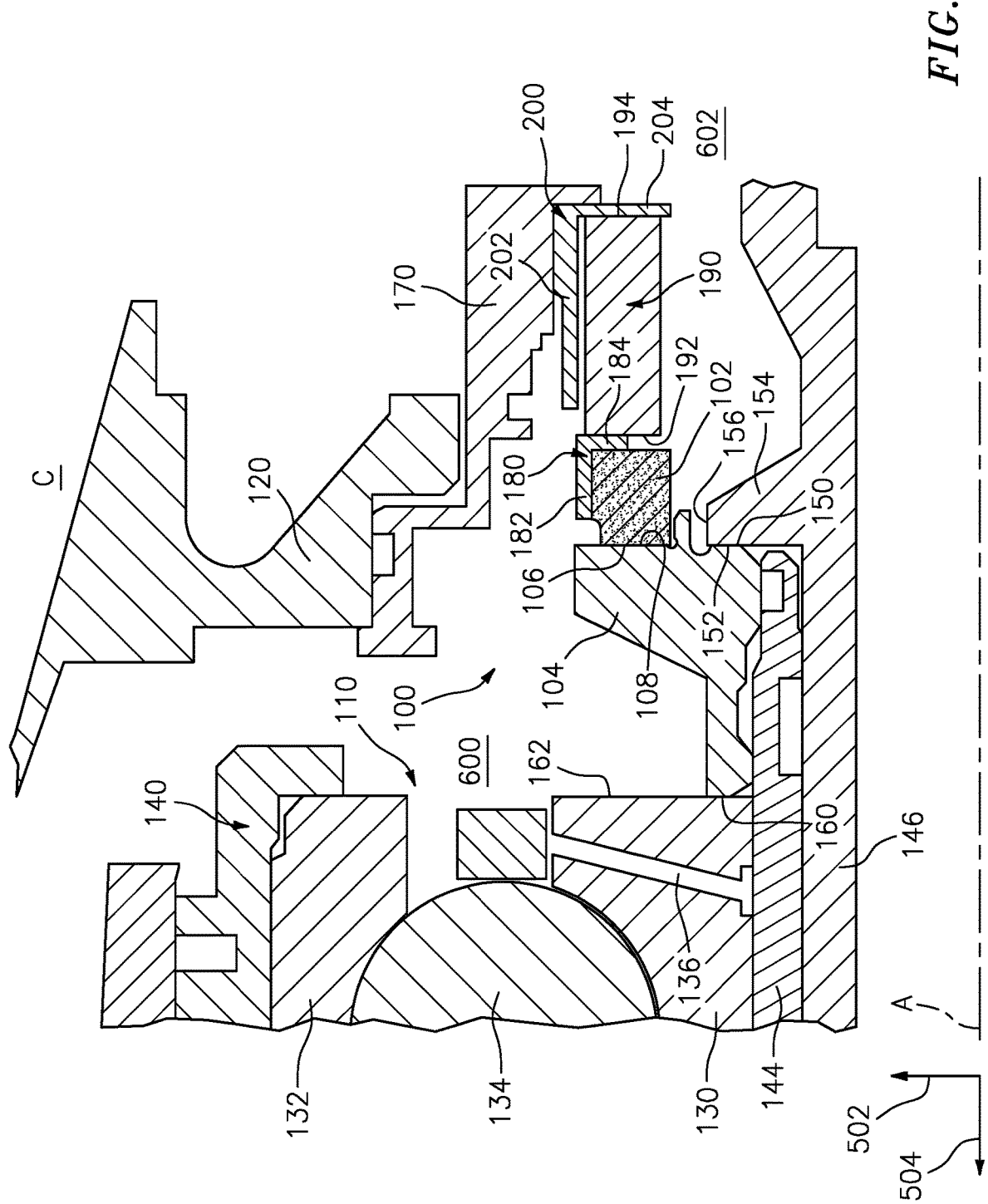
FIG. 1 is a partial partially schematic central axial sectional view of a seal system.

FIG. 1 shows a seal system 100 having a seal 102 and a seat 104. As is discussed further below, the seal system is used in a turbomachine such as a gas turbine engine for a purpose such as isolating a bearing compartment 600. The seal is mounted to a first structure such as an engine static structure and the seat is mounted to rotate relative thereto (e.g., mounted to a shaft) about an axis A which may be the engine centerline or central longitudinal axis.

The example seal 102 is a carbon seal having an axially-facing/radially-extending seal surface or face 106. The example seal 102 is formed as single-piece or segmented body of revolution about an axis normally coincident with the centerline A.

FIG. 1 further shows an outward radial direction 502 and a forward direction 504. The seat 104 has an axially-facing/radially-extending seat surface or face 108 engaging the seal face 106. The seal system 100 isolates a space or volume 600 from a space or volume 602. The example space or volume 600 is a bearing compartment. The example seal system is at an aft end of the bearing compartment. A similar or other seal system (not shown) may be at a forward end of the bearing compartment. The example bearing compartment 600 contains a bearing 110 supporting the shaft for rotation relative to the static structure about the axis A. The example second space or volume 602 is a buffer chamber. In the example engine configuration and position, a case component 120 (e.g., a strut ring/frame) of the static structure is positioned radially inboard of a gas path (core flowpath) C. The seal is a dry face seal in that there are no oil passageways to the seat face 108.

Figure 2:
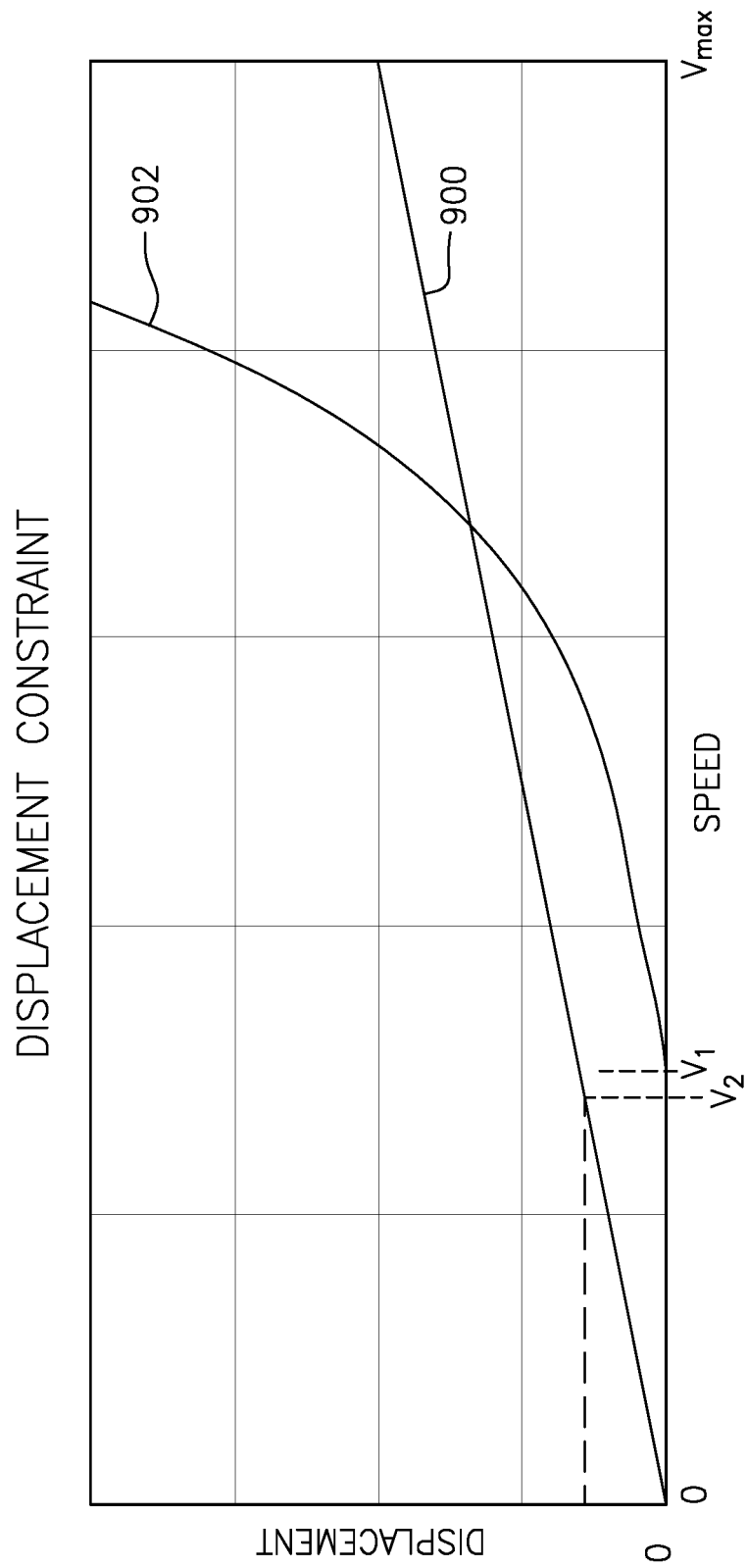
FIG. 2 is a plot of seal displacements against speed.

The faces 106 and 108 are axially-facing/radially extending faces. This engagement allows relative radial displacement of seal and seat. A dynamic component of the radial displacement is a function of the seal's dynamic response to excitation. Analytical modeling, experimental data, and engine test data has shown an excitation mode can exist which initially starts as a pure radial displacement. FIG. 2 shows a plot 900 of radial displacement versus rotational speed (frequency) from zero to maximum speed $v_{max}$ (of the spool which includes the seat). This displacement increases generally steadily without any relative axial displacement until a certain value $v_1$ is reached where the radial displacement becomes coupled with a relative axial displacement 902 (not shown to the same scale as radial displacement in FIG. 2). As noted above, the axial displacement may be measured as the axial displacement at the circumferential location of maximum axial displacement at a given time/speed. The axial displacement may increase much more rapidly with speed and the coupled motion results in catastrophic damage to structural integrity and operability of the seal. The exact extents of these conditions are functions of the seal size, material pair, engine configuration, and operating conditions.

As is discussed further below, to prevent or at least limit the coupled dynamic displacement, a constraint on the relative radial freedom of movement is imposed to limit the relative radial displacement. For example, it may be limited to less than the extent at which axial displacement initiates. In FIG. 2, this displacement is associated with speed $v_2$.

The example bearing 110 is a rolling element bearing have an inner diameter (ID) race 130 (inner race), an outer diameter (OD) race 132 (outer race), and a circumferential array of rolling elements 134 (e.g., balls). The bearing may be lubricated (e.g., via passages 136 delivering oil from an oil system (not shown)) so that the bearing compartment 600 contains oil. Thus, the seal system 100 may serve to contain the oil in the bearing compartment to prevent leakage out. The outer race 132 is carried by a bearing support 140 which, in turn, is carried by the case component 120.

The inner race 130 is mounted to a shaft of the engine. An example shaft is the high speed shaft of a two-spool turbofan. The example inner race 130 is mounted to the sleeve 144 of a gear (e.g., for engaging a tower shaft for an accessory gearbox/starter) which is, in turn, mounted to a main shaft piece 146.

Radially inboard of the seat face 108, the seat 104 has an aft-facing abutment surface 150 abutting a forward facing surface 152 of a flange or shoulder 154 on the shaft main piece 146. The flange or shoulder 154 has an outer diameter (OD) surface 156. The seat 104 has a forward rim surface 160 abutting an aft end face 162 of the inner race 130.

The example seal system 100 includes a seal housing 170 for mounting to the remaining static structure of the engine.

As is discussed further below, the seal 102 is mounted in a seal carrier 180 (e.g., a single-piece alloy machining) having an outer diameter collar/sleeve section 182 and a radial flange 184. The aft portion of the seal OD face and an OD portion of the seal aft face respectively contact an ID face of the sleeve 182 and a forward face of the flange 184. One or more springs 190 (e.g., a single bellows spring shown schematically encircling the centerline A) axially bias the seal 102 into engagement with the seat 104.

The spring 190 extends between a forward end 192 and an aft end 194. The spring is carried by a spring carrier 200

(e.g., a single-piece alloy machining) which, in turn, is mounted to the housing 170. The spring carrier 200 has an outer diameter (OD) collar/sleeve section 202 and a flange 204. The spring aft end abuts and is secured to the forward face of the flange 204 and the spring forward end 192 abuts and is secured to the aft face of the flange 184.

Figure 1A:
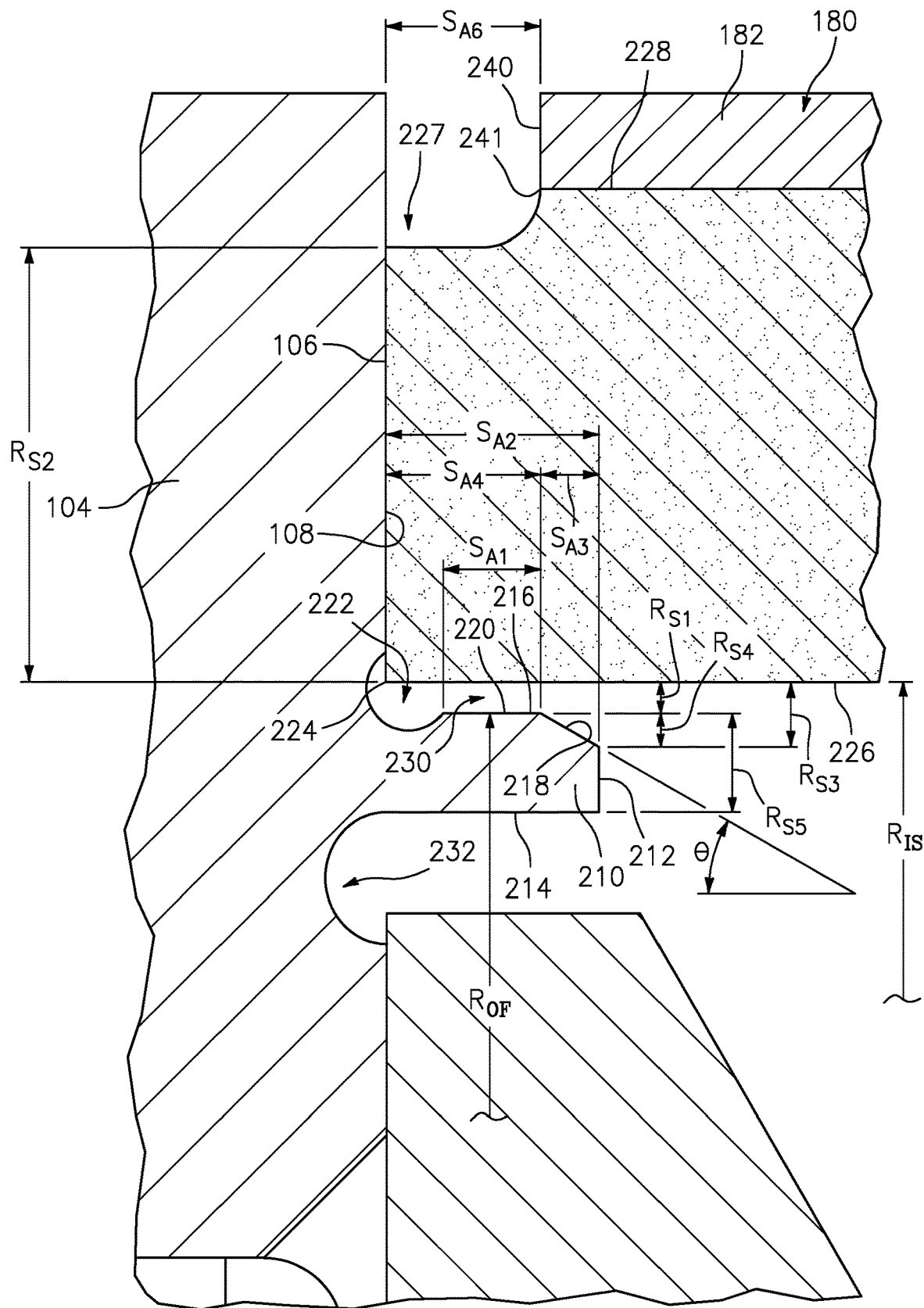
FIG. 1A is an enlarged view of the seal system of FIG. 1.

FIG. 1A further shows the seat 104 as including a section 210 protruding axially beyond the seat face 108 to a rim 212 and having an inner diameter (ID) surface 214 and an outer diameter (OD) surface 216. The OD surface has an aft bevel or chamfer 218 leading to the rim 212 and a main axial portion 220 between that and the seat face 108. A junction between the OD surface 216 and the seat face 108 has an undercut 222 both axially and radially relieving. The undercut 222 provides stress relief at the junction of the surface 216 and the seat face 108 also accommodates debris and limits/prevents wear and other damage to the ID edge portion 224 of the seal nose at a junction sealing face 206 and seal ID surface 226.

There is an additional axial undercut 232 to the ID of the flange at a proximal root of the flange. The undercut 232 isolates the protruding section 210 from contact stresses in the seat caused by the compressive engagement of the surfaces 150 and 152. The example undercut 232 is axial-only; whereas the undercut 222 is axial/radial.

FIG. 1A also shows the sleeve 182 as having a forward rim 240 axially recessed relative to the seal face 106. This recessing accommodates seal wear and reduces with use. A recess/rebate 227 in the seal's OD surface 228 ahead of the rim 240 limits contact stresses in the seal at the ID forward corner 241 of the sleeve cross-section. This is particularly relevant where the seal is in radial interference fit with the sleeve.

A gap 230 is shown between the ID face 226 of the seal and the OD surface 216 of the protruding section 210. The gap 230 has essentially constant minimum radial span (radial height) along the main axial portion 220 of the surface 216 which has an axial span $S_{A1}$. $S_{A1}$ may be a substantial fraction of the span of axial protrusion of the protruding section 210 beyond the seat face 108 (shown as $S_{A2}$). Example $S_{A1}$ is 25% to 75% of $S_{A2}$. An axial span of the protruding section 210 measured between the seat face 108 and the beginning (proximal end) of the chamfer 218 is shown as $S_{A4}$.

FIG. 1A shows a radial span of the gap as $R_{S1}$ shown centered between local seal ID radius $R_{1S}$ and flange OD surface portion 216 radius $R_{OF}$. In an example of a cylindrical surface portion 216, $R_{OF}$ varies by no more than 0.12%, more narrowly 0.075%, more narrowly 0.035%. FIG. 1A also shows a radial span of the seal face 106 as $R_{S2}$. As noted above, the centered $R_{S1}$ is selected to correspond to the radial displacement at the FIG. 2 speed $v_2$. In typical engine main shaft applications, $R_{S1}$ may be 0.025 mm to 1.27 mm. Other applications (e.g., gearbox, pumps, auxiliary equipment) will typically be smaller. In a relative sense, example $R_{S1}$ for such engine main shaft applications may be 0.035% to 1.50% of the radius $R_{OF}$ from the centerline A to the OD surface portion 216, more particularly 0.35% to 0.75%. Broader applications may have $R_{S1}$ 0.020% to 20% of the radius $R_{OF}$ (with larger percentages being associated with smaller radii). Appropriate $R_{S1}$ may be determined iteratively and/or based on experience. In an iterative example, a large initial value may be progressively reduced in iterations until the axial displacement no longer is initiated. The axial displacement may be monitored using accelerometers attached to OD sleeve 182 or strain gauges on spring or springs 190.

An axial span of the chamfer is shown as $S_{A3}$. Example $S_{A3}$ is at least 10% of $S_{A2}$, more particularly, 25% to 50%. In typical applications, $S_{A2}$ may be 1.25 mm to 12.7 mm, more particularly 1.25 mm to 5.0 mm. In typical applications, $S_{A3}$ may be at least 0.25 mm, more particularly 0.25 mm to 2.50, more particularly 0.50 mm to 1.0 mm. The example angle of the chamfer (a half angle θ of the cone of chamfering) is 10° to 45°, more particularly, 25° to 40° or 20° to 30°.

FIG. 1A shows a radial span from the radial inboard/distal end of the chamfer 218 to the seal ID face 216 as $R_{S3}$ (when concentric). As is noted above, $R_{S1}$ is selected based upon limiting dynamic excursions. $R_{S3}$ is chosen to make the ID of the chamfer effective to partially center the seal 102 relative to the seat during assembly to address sag in the seal. In typical engine main shaft applications, $R_{S3}$ may be 0.75% to 3.50% of the radius $R_{OF}$ from the centerline A to the OD surface portion 216, more particularly 1.50% to 2.50%. As noted above for $R_{S1}$, this may scale substantially upward for smaller scale applications.

FIG. 1A shows a radial span of the chamfer 218 as $R_{S4}$. In typical applications, $R_{S4}$ may be 0.050% to 20% of the radius $R_{OF}$ from the centerline A to the OD surface portion 216, more particularly 0.050% to 1.0% (particularly for larger applications).

FIG. 1A shows a radial span of the flange as RSs. In typical applications, RSs may be 0.50% to 50% of the radius $R_{OF}$ from the centerline A to the OD surface portion 216, more particularly 0.75% to 10.0%.

Figure 3:
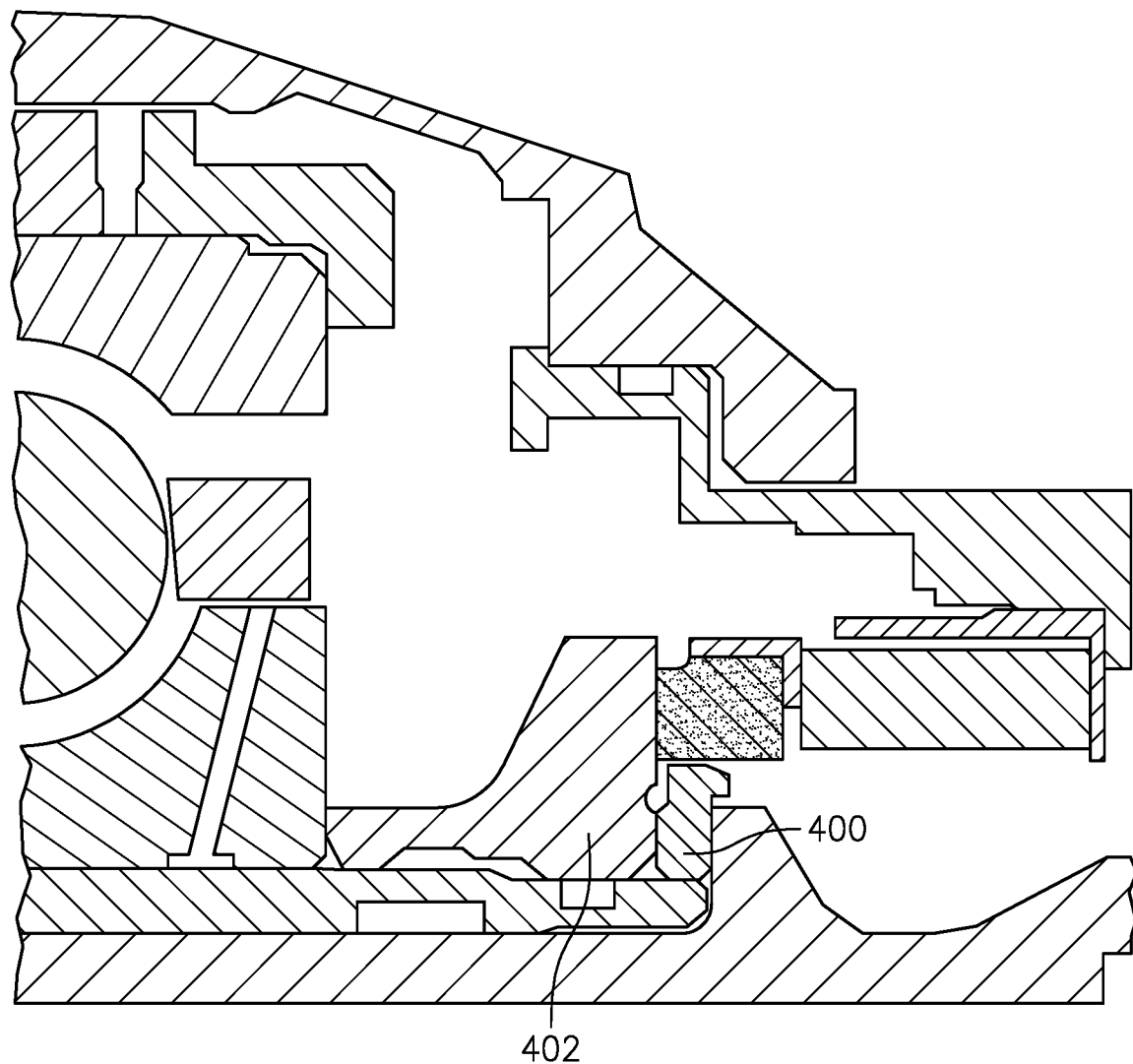
FIG. 3 is a partial partially schematic central axial sectional view of a second seal system.
Figure 3A:
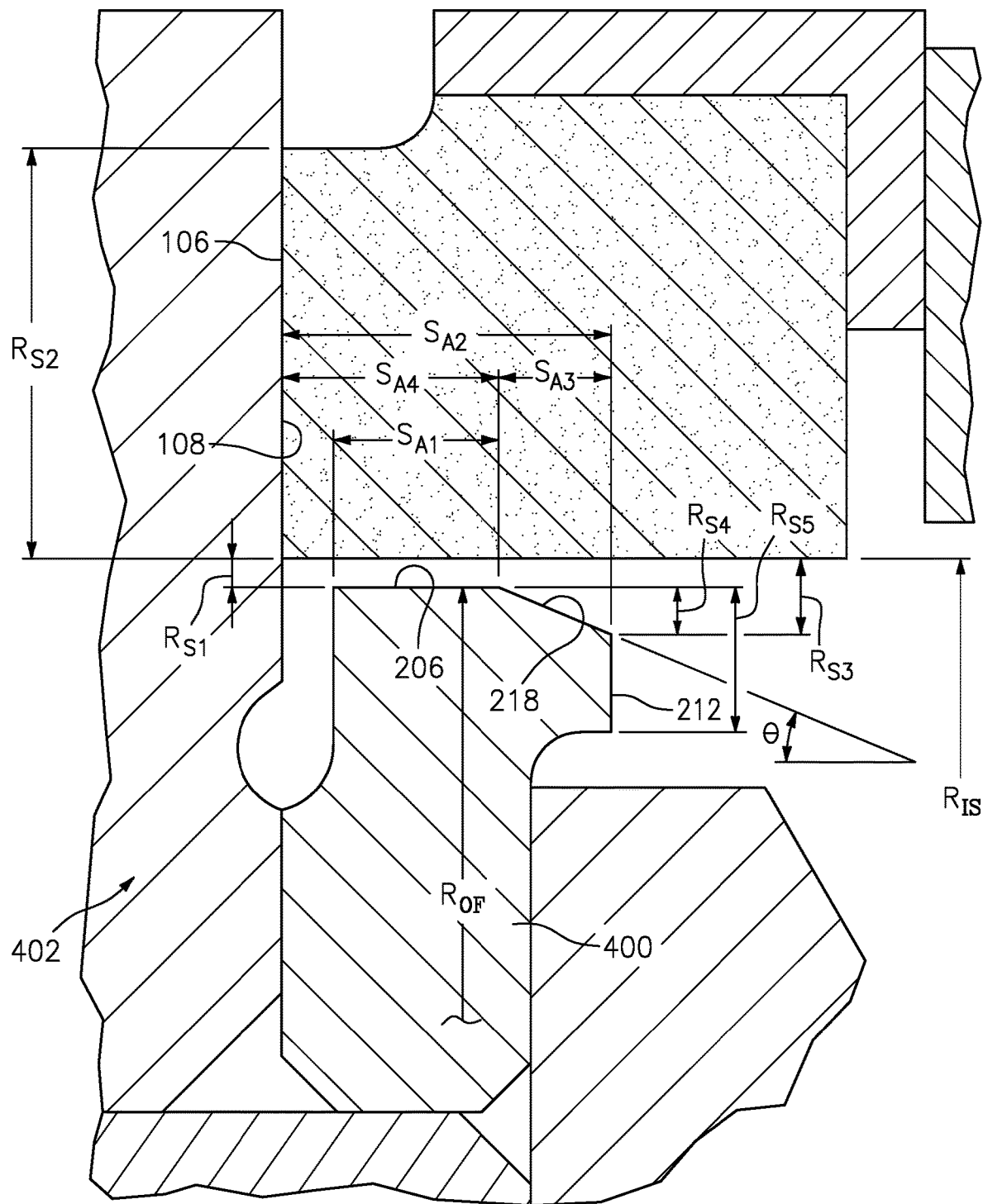
FIG. 3A is an enlarged view of the seal system of FIG. 3.

FIG. 3 shows an alternative implementation wherein the chamfer and the radial stop surface are on a spacer piece 400 separate from a main seat piece 402. Other than the configuration of these two pieces, the illustrated example is the same as FIG. 1.

Component materials and manufacture techniques and assembly techniques may be otherwise conventional. The example bellows spring is formed of steel (e.g., stainless) and may be assembled by welding individual essentially frustoconical sections to each other. remaining components may be machined. In an example of an assembly procedure, the spring ends are welded to the associated flanges of the spring carrier and seal carrier respectively. The seal is installed to the seal carrier such as via thermal interference fit (e.g., heating the seal carrier to radial expand and then axially inserting a single-annulus or segmented annulus seal and allowing the seal carrier to cool into radial interference). This seal assembly may then, similarly, be installed to the housing 170. An example installation involves a combination of thermal interference and anti-rotation keying. The housing 170 may be heated and the seal assembly linearly inserted and held in place while the housing is allowed to cool. Example anti-rotation/keying features (not shown) include: slot and key features; bolted flange features; and slot and groove with retention wire. A bolted flange may replace the interference fit.

The housing may similarly be installed to the case structure. In a thermal interference fit example, the inner diameter surface of the housing-receiving compartment of the case structure may be heated to radially expand. The housing/seal subassembly may be installed into case structure by linear translation while case structure remains hot. An axial load may be placed on the front of the housing and maintained until temperatures are sufficiently normalized. Bolts or other fasteners (not shown) may then be installed at various circumferential locations on mating flanges of the housing and case. Such fasteners combined with the interference fit retain the subassembly to the case. Many other methods are possible and include slot and groove engagement with retaining wire and accompanying o-ring interface.

A further subassembly comprising the bearing, seat, spacer (if present) and gear may be assembled. In an example process, the bearing, seat, spacer 400 (if present), are heated at their respective inner diameters (e.g., via torch) and installed onto gear sleeve 144 by linear translation while each remain hot. An axial load may be placed on them and maintained (e.g., until temperatures return to room temperature or within a sufficient margin to provide the thermal interference fit).

That bearing-seat-gear subassembly may be installed as a unit. Prior to that the bearing support 140 may be installed to the case structure. An inner diameter surface portion of the case structure to engage the support 140 may be locally heated (e.g., via torch heating). The support may then be installed (e.g., by linear translation) and an axial load applied to the support and maintained (e.g., until temperatures return to room temperature or within a sufficient margin to provide the thermal interference fit).

Bolts or other fasteners (not shown) may then be installed at various circumferential locations on mating flanges of the support and case.

The bearing-seat-gear subassembly is then heated (e.g., via torch) at the inner diameter of gear sleeve and the support 140 is heated (e.g., via torch) at an ID surface that mates with the bearing outer race. The bearing-seat-gear subassembly may then be installed to the shaft piece 146 and support 140 (e.g., by linear translation). During this installation, the chamfer 218 will pass within the seal 102. As the chamfer approaches the seal, the seal, seal carrier, and bellows spring are cantilevered from the spring carrier. In a horizontal assembly situation, there will be a gravity-induced sag so that there is contact of the chamfer and seal front ID edge at 12 o'clock. The chamfer will guide the seal onto the main axial portion 220 from where the seal face passes into engagement with the seat face. Absent the chamfer, the rim 212 might collide with and either be stopped by or damage the seal. An axial load applied to the subassembly compresses the bellows spring and is maintained (e.g., until temperatures return to room temperature or within a sufficient margin to provide the thermal interference fit). This leaves the bellows spring precompressed.

Other components can be loaded onto the resulting stack until a stack nut ends the stack and via torque or displacement control applies a load thereby trapping components between the nut and the shaft shoulder.

Many alternate configuration exists and many alternate sequences also exist and are not limited to the methods and sequence described above. Furthermore, the gear reflects one particular location of many potential locations. The shaft may have many more members such as an oil-scoop or other bearing compartment components.

Although a stop surface and guide chamfer to the OD of the seal would also limit excursions and guide assembly, that is less advantageous from several points of view. First, debris may be flung radially outward from the seal due to centrifugal action and would be trapped by such an OD surface. Second, for typical seal configurations there is more axial space available to the ID of the seal. For example, particularly as the seal wears there is a risk that an OD structure would interfere with the seal carrier.

The function in limiting radial excursions is particularly relevant to bellows springs because the bellows springs provide sealing. Other springs (e.g., a circumferential array of coil springs) have a separate sealing sheath or sheaths directly or indirectly sealing the seal carrier to the housing. Such secondary sealing elements may damp vibration and thereby reduce the resonant coupling relative to a bellows seal of similar spring constant/compression.

In designing the protruding section of seat piece 102 or spacer piece 400, the axial span $S_{A1}$ may be selected to be sufficiently long to provide sufficient distribution of radial contact force to limit seal ID wear from excursions that are stopped. $S_{A3}$ is selected to provide the desired radial span $R_{S3}$ in view of $R_{S1}$ and the desired angle θ. $S_{A4}$ reflects the combination of these axial spans plus the desired axial span of the relief 222.

The axial span $S_{A4}$ may be limited in some embodiments by potential obstructions such as a seal carrier that has an ID sleeve similar to the OD sleeve 182 and/or a seal with an ID rebate similar to OD rebate 227. In such a situation, flange axial span $S_{A4}$ may accommodate the allowable wear length of the seal. The allowable wear length is inherently limited by the length $S_{A6}$ (FIG. 1A) of the recessing of the seal carrier rim 240 relative to the seal face 106. In typical applications, $S_{A4}$ may be 0.10% to 80% of the radius $R_{OF}$ from the centerline A to the OD surface portion 216, more particularly 0.10% to 10% or 0.25 mm to 5.0 mm.

As noted above $S_{A1}$ may be selected to be sufficiently long to axially distribute forces during contact with the seal ID surface 226. In typical applications, $S_{A1}$ may be 0.10% to 80% of the radius $R_{OF}$ from the centerline A to the OD surface portion 216, more particularly 0.10% to 10% (as a rough value this is given as the same as $S_{A4}$ despite the presence of the relief 222).

Figure 4:
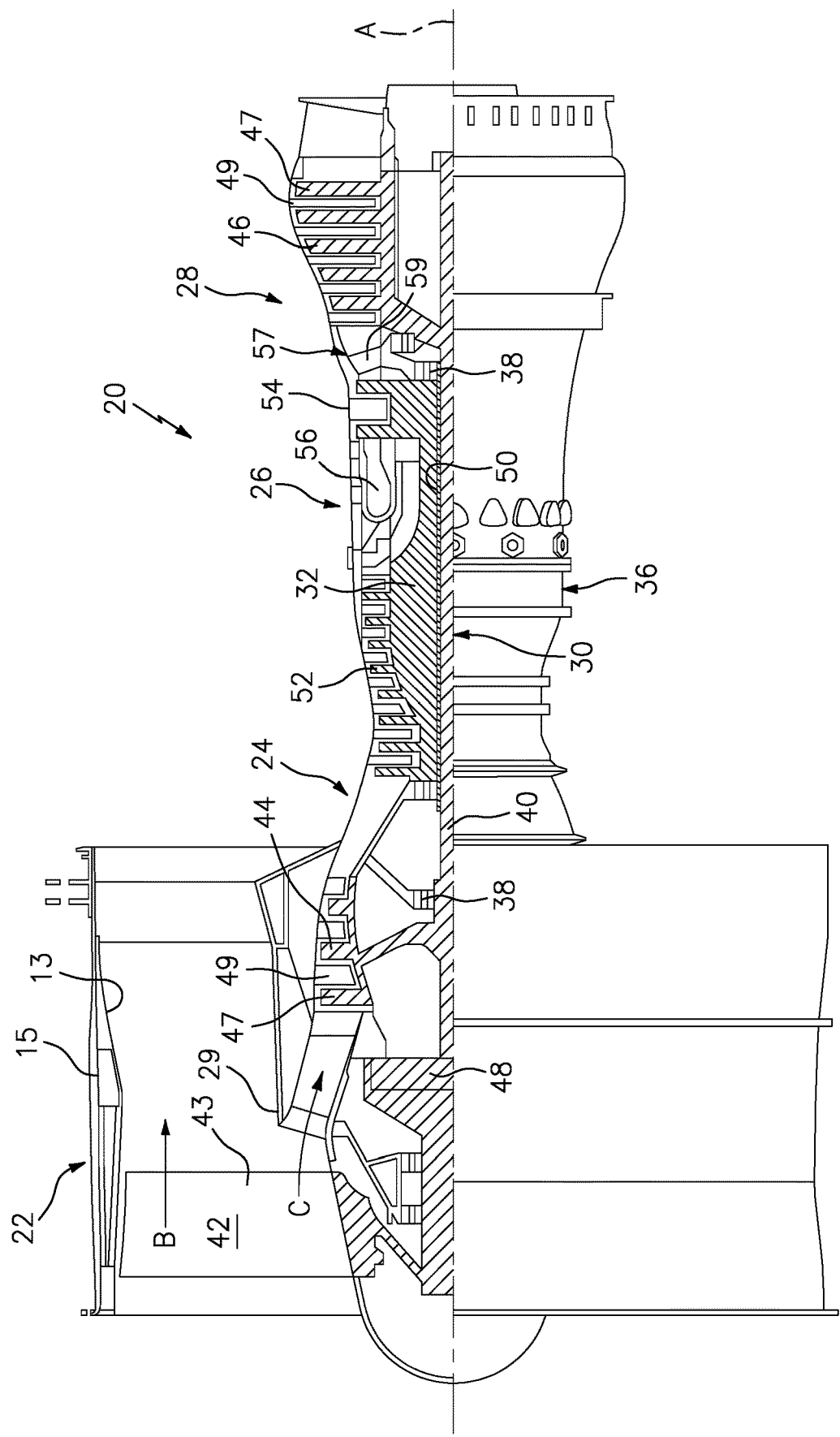
FIG. 4 is a schematic view of a gas turbine engine in which the seal system may be included.

FIG. 4 schematically illustrates a gas turbine engine 20 as one of many examples of an engine in which the seal system 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A (forming the axis 500) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline turbomachine or seal configuration, details of such baseline may influence details of particular implementations. Accordingly, other embodiments are within the scope of the following claims.

What is claimed is:

1. A method for assembling an apparatus, the apparatus comprising:
    a first member;
    a shaft rotatable relative to the first member about an axis; and
    a seal system comprising:
        a seal carried by the first member and having a seal face; and
        a seat carried by the shaft and having a seat face in sliding sealing engagement with the seal face,
    wherein:
        the seal is a carbon seal;
        the seal system has a bellows spring axially biasing the seal into engagement with the seat;
        the seal system is a dry face seal system;
        the seat further comprises a section having:
            an outer diameter surface encircled by the seal; and
            a rim,
    the method comprising:
        mounting the seal to the first member so as to be cantilever supported by the bellows spring; and
        installing the seat so that the section passes radially within the seal, the installing causing the section to contact the carbon portion of the seal and radially shift the seal.

2. The method of claim 1 wherein:
    sag of the cantilever support causes the installing to cause the section to contact the seal and radially shift the seal.

3. The method of claim 1 wherein the section is along a protruding flange having:
    an inner diameter surface; and
    an axial undercut at a root of the section.

4. The method of claim 1 wherein the section has:
    a chamfer surface between the outer diameter surface and the rim.

5. The method of claim 4 wherein the chamfer surface has a half angle of 10° to 45° over at least one of:
    a radial span $R_{S4}$ of at least 0.50% of a maximum radius of the seat section; and
    a length $S_{A3}$ of at least 0.25 mm.

6. The method of claim 1 wherein:
    the seat face and the section are of a single unitary piece.

7. The method of claim 1 wherein:
    the seat face is on a first piece and the section is formed on a second piece.

8. The method of claim 7 wherein the first piece has:
    a contact face contacting a face of the second piece; and
    a channel between the seat face and the contact face.

9. The method of claim 1 wherein:
    the seat is steel.

10. The method of claim 1 wherein:
    the seal and seat are full annular; and
    the seal is interference fit in a seal carrier.

11. The method of claim 1 wherein:
    the bellows spring is captured between a spring carrier and a seal carrier; and
    the seal carrier carries the seal.

12. The method of claim 11 wherein:
    the seal carrier has an outer diameter sleeve section in interference fit with the seal.

13. The method of claim 1 being wherein the apparatus is a gas turbine engine.

14. The method of claim 1 wherein:
    the section has a chamfer surface between the outer diameter surface and the rim; and
    the installing causes the chamfer to contact the seal and radially shift the seal.

15. A method for using an apparatus, the apparatus comprising:
    a first member;
    a shaft rotatable relative to the first member about an axis; and a seal system comprising:
  a carbon seal carried by the first member and having a seal face; and
  a seat carried by the shaft and having a seat face in sliding sealing engagement with the seal face,
wherein:
  the seal system is a dry face seal system;
  the seat further comprises a section having:
    an outer diameter surface encircled by the carbon seal; and
    a rim,
the method comprising:
  rotating the shaft relative to the first member about the axis; and
  a dynamic radial excursion of the shaft relative to the first member causing contact between the seat section outer diameter surface and an inner diameter surface of the carbon portion of the carbon seal.

16. The method of claim 15 further comprising:
a spring biasing the seal toward the seat.

17. The method of claim 15 wherein:
the contact is effective to prevent axial separation between the seal and the seat.

18. The method of claim 15 wherein:
the seal system has a bellows spring axially biasing the seal into engagement with the seat;
the bellows spring is captured between a spring carrier and a seal carrier; and
the seal carrier carries the seal.

19. The method of claim 18 wherein:
the apparatus is a gas turbine engine.

20. The method of claim 15 wherein:
the apparatus is a gas turbine engine.

* * * * *